April 24, 1945. W. H. J. BROCK 2,374,270
LOCATING AND SECURING DEVICES
Filed Dec. 13, 1943

Inventor
William Hudson James Brock
by Stevens and Davis
his attorneys

Patented Apr. 24, 1945

2,374,270

UNITED STATES PATENT OFFICE 2,374,270

LOCATING AND SECURING DEVICE

William Hudson James Brock, Leamington Spa, England, assignor of one-half to Automotive Products Company Limited, Leamington Spa, England Application December 13, 1943, Serial No. 514,172
In Great Britain December 21, 1942

7 Claims. (Cl. 287—119)

This invention relates to locating and securing devices.

It is the primary object of the present invention to provide an extremely simple yet effective method and means for fastening one member within another, the invention being especially applicable to the manufacture of such mechanical components as pistons, plungers and cylinders.

In an assembly including an inner member, and an outer member having an openig into which the inner member is fitted, according to the invention the improved method of holding the members together comprises forming one of the members with a flange, which latter is initially of funnel shape, forming the other member with a corresponding groove, fitting the members together and applying a flattening pressure to the flange so that its marginal part is caused to interlock with the groove.

According to another aspect of the invention the improved method comprises forming one of the members with a flange which is initially of frusto-conical shape, forming the other member with a corresponding annular groove, fitting the members together and applying an axial flattening pressure to the flange so that it assumes a substantially flat annular shape and its marginal part interlocks with the said groove.

In an assembly including an inner member and an outer member having an opening into which the inner member is fitted, according to a further feature of the invention means are provided for holding the members together comprising a flange forming part of one of said members, said flange being initially of funnel shape and being arranged to interlock with a groove in the other of said members when the flange is pressed to assume a substantially flat condition. Conveniently the inner member is cylindrical and fits within a cylindrical hole in the outer member, the flange being in the form of a continuous annulus arranged to interlock around its whole circumference with the groove, which latter is annular. The flange may be formed by the provision of a substantially V-shaped groove in the corresponding member, the side walls of which groove are brought substantially into contact with one another as the flange is flattened.

If desired the outer member may be formed with a cylindrical recess, the mouth of which is constituted by an annular flange having its edge facing towards the axis of the recess, the flange being initially of frusto-conical shape with its outer surface inclined outwards in the direction towards said axis, and the internal diameter of the flange being (before being flattened) substantially the same as the recess. The inner member can be cylindrical to fit within the recess and have a circumferential groove for interlocking engagement by the flange, that wall of the groove remote from the recess conveniently being too large to pass through the frusto-conical flange, so that axial pressure to force the inner member into the outer causes said inner member to flatten the flange and bring the inner edge thereof into locking engagement with the groove in the inner member.

In an alternative arrangement the outer member is formed with a cylindrical recess having at a position spaced from its mouth, an annular groove for engagement by the outer margin of a frusto-conical flange when said flange is flattened, said flange being carried by the inner member. Preferably the frusto-conical flange is formed integrally upon the end of the inner member and the recess has a bottom surface against which the flange is forced by the inner member to bring about flattening of said flange. The inner member may be screw-threaded into the cylindrical recess in the outer, whereby continued relative rotation of said members after the flange has engaged the bottom of the recess causes the flange to be flattened and produces interlocking of the members. If desired the margin of the flange may in all cases be initially in the form of a narrow cylindrical surface, the groove with which said margin is to engage having its "bottom" surface inclined with respect to the axis of the recess so as to conform substantially to the final shape of said margin after the flange has been flattened.

The invention is illustrated by way of example in the accompanying diagrammatic drawing, in which.

Figures 1, 2:
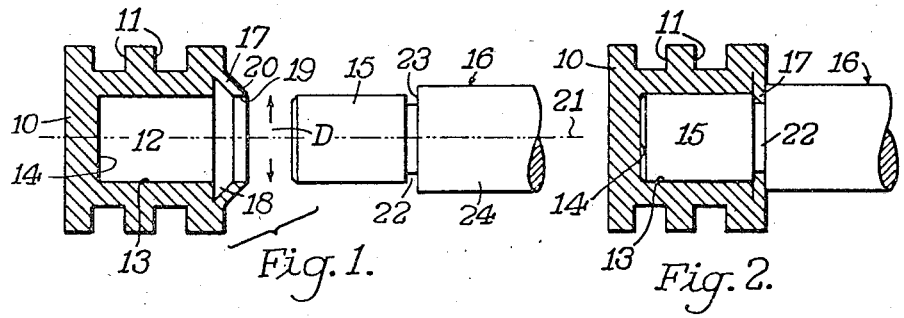
Figure 1 is a part-sectional side elevation of a piston and the end portion of a piston rod, these being in readiness for securing together.
Figure 2 is a similar view of the parts when the assembly is complete.

In the arrangement shown in Figures 1 and 2 a piston 10 in the form of a substantially cylindrical block having grooves 11 around its periphery for the accommodation of packing rings (not shown) has a coaxial substantially cylindrical recess 12, the curved side wall of which is indicated at 13 and the bottom at 14. This recess is arranged to receive snugly the end portion 15 of a piston rod 16.

The improved means for securing the piston 10 to the piston rod 16 comprises a frusto-conical flange 17, which is formed integrally with the piston 10 and is conveniently produced by forming around the mouth portion of the recess 12 an annular groove 18 which is of substantially V-shaped section, as will be seen in Figure 1. Preferably the flange 17 is of substantially uniform thickness, its marginal part being constituted by a cylindrical surface 19, which in diameter is equal to the recess 12, as indicated at D. It will be seen that the outer surface 20, which is remote from the recess 12, is inclined upwards towards the axis 21 of the recess 12 and piston rod 16. The piston rod 16 is formed with an annular groove 22, that wall 23 of which is arranged to be too large to pass through the flange 17; this can conveniently be effected by making the part 24 of the piston rod 16 somewhat larger in diameter than the portion 15.

To assemble the members 10 and 16, the portion 15 is inserted through the flange 17 and into the recess 12, and when the wall 23 of the groove 22 bears against the flange 17 endwise an axial force is exerted upon the parts, conveniently by means of a press (not shown). This causes the flange 17 to be substantially flattened, as shown in Figure 2, so that its internal diameter is considerably decreased and the flange 17 has to find accommodation in the groove 22. During this action the V-shaped groove 18 behind the flange 17 substantially disappears, the two side walls of said groove being pressed into contact with one another. The piston 10 can be secured immovably to the piston rod 16 or can be allowed freedom to rotate thereon, depending upon the clearance between the two members. It is, however, when assembled, positively located against substantial axial movement relative to the piston rod 16. If desired the main part 24 of the piston rod 16 can be the same diameter or smaller than the end portion 15, in which case the flange 17 will need to be engaged by a pressing member (not shown) as the parts are assembled so as to cause said flange to become flattened and consequently engaged within the groove 22 of the piston rod 16.

Figures 3, 4:
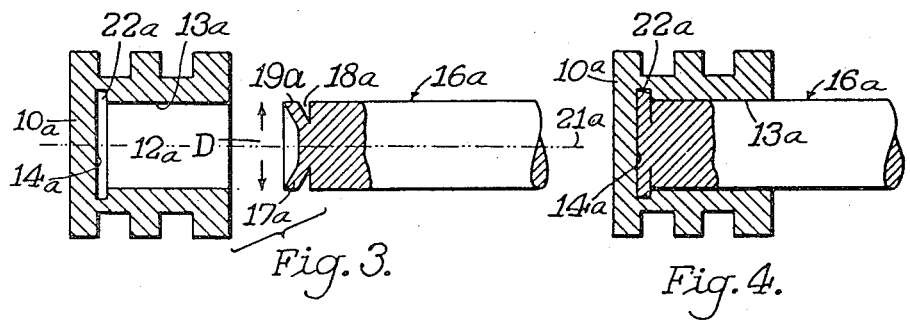
Figures 3 and 4 are views similar to Figures 1 and 2 respectively but showing a modified construction of interlocking means.

In the modified arrangements shown in Figures 3 and 4 the flange 17a is formed integrally upon the extreme end of the piston rod 16a. It is, as before, of substantially frusto-conical shape, but it is inclined outwards away from the axis 21a. In this instance its outer surface 19a is cylindrical and is of the same diameter as the piston rod 16a, so that initially it is a smooth sliding fit within the curved wall 13a or the recess 12a in the outer member constituted by the piston 10a. The diameter of the flange 17a is again indicated at D, said flange being formed by making an annular groove 18a of substantially V-shape in section completely around the end part of the piston rod 16a. Adjacent the bottom 14a of the recess 12a the latter is undercut by the provision of the groove 22a, which is adapted to receive the marginal part of the flange 17a when the latter is flattened, as indicated in Figure 4. To produce this assembled state the parts are forced axially into full engagement, the flange 17a being thereby forced flat against the bottom 14a of the recess 12a and consequently having its effective diameter increased, so that its outer marginal part engages within the groove 22a.

Figures 5, 6:
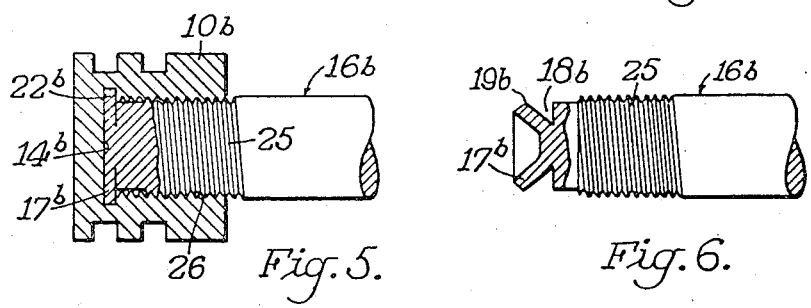
Figure 5 is a part-sectional elevation of an assembled piston and piston rod having a modified construction.
Figure 6 is a part-sectional side elevation of the piston rod shown in Figure 5, but prior to assembly.

In the form of piston assembly shown in Figure 5 the piston rod 16b is provided at its end part with a screw thread 25, this being arranged to mate with a corresponding screw-threaded recess 26 in the piston 10b. Adjacent its bottom 14b this recess is undercut by the provision of an annular groove 22b adapted to accommodate the flange 17b, which is formed integrally with the piston rod 16b. The initial form of this flange 17b is shown in Figure 6; it is substantially frusto-conical and is produced by forming a substantially V-shaped groove 18b adjacent the end of the piston rod 16b, the external surface 19b of the flange 17b being just sufficiently small to pass freely into the screw-threaded recess 26. When the piston rod 16b is screwed firmly into position the flange 17b is forced against the flat bottom 14b of the recess 26 and is consequently flattened. This causes its external diameter to be increased and the flange consequently becomes interlocked with the groove 22b.

Figure 7:
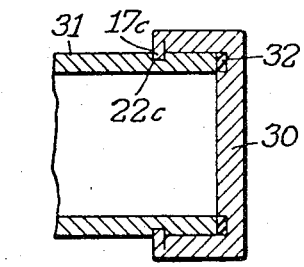
Figure 7 is a sectional elevation of a cylinder and cap assembly.

Another example to demonstrate the adaptability of the invention is shown in Figure 7, where an end cap 30 is secured in position upon a tubular cylinder 31. The cap 30 is formed at its mouth portion with a flange 17c, which, prior to assembly, is substantially frusto-conical and is similar to the flange 17 in Figure 1. The cylinder 31 is formed with an annular groove 22c for engagement by this flange 17 when the latter is flattened in a press and is consequently reduced in internal diameter. An annular packing washer 32 is accommodated within a groove in the cap 30 in order to produce a fluid-tight joint. Instead, or in addition, however, a resilient washer could be provided within the groove 22 prior to the flattening of the flange 17 so that the latter, when flattened, bears against said washer.

It will be understood that the arrangements which have been described are given merely by way of example and that numerous modifications are possible to suit requirements. For instance, the invention is applicable where the recess in the outer member and the corresponding part of the inner member are not circular in cross-section, for it will be obvious that these parts may be square or of any other desired shape, the deformable flange being modified to suit, but in all cases preferably being endless. Moreover the flange need not be strictly frusto-conical in section, and this term is used in the present specification in its widest signification; the flange clearly might be somewhat curved or corrugated in radial section in addition to or instead of being of generally frusto-conical shape, while its thickness may be graduated or uniform, as desired.

What I claim is:

1. A pair of male and female members adapted to coact to establish a connection therebetween, one of said members having a funnel-shaped flange thereon and an annular pressure face, said flange and face defining therebetween an annular clearance groove, and the other of said members having therein an annular locking groove whereby the members may be connected by forcing them axially into full engagement to cause the flange to spread radially into said locking groove and to abut said annular pressure face to close the clearance groove.

2. A pair of male and female members adapted to coact to establish a connection therebetween, one of said members having a funnel-shaped flange thereon and an annular pressure face, said flange and face defining therebetween an annular clearance groove of substantially V-shape in radial section, and the other of said members having therein an annular locking groove whereby the members may be connected by forcing them axially into full engagement to cause the flange to spread radially into said locking groove and to abut said annular pressure face to obliterate the clearance groove.

3. Coacting members as claimed in claim 1 wherein the funnel-shaped flange is formed integrally on the mouth portion of the socket of the female member and wherein the male member is provided with a shoulder for flattening the flange against the pressure face.

4. Coacting members as claimed in claim 1 wherein the funnel-shaped flange is formed integrally on the mouth portion of the socket of the female member and wherein the bore of said flange is cylindrical and of the same diameter as the bore of the socket member.

5. Coacting members as claimed in claim 1 wherein the funnel-shaped flange is formed on the end of the male member and wherein the locking groove is within the female member.

6. Coacting members as claimed in claim 1 wherein the funnel-shaped flange is formed on the end of the male member and wherein the female member defines a substantially cylindrical recess an end wall portion of which is adapted to flatten the funnel shaped flange upon axial compressive engagement of said members.

7. Coacting members as claimed in claim 1 wherein the members are cooperatively threaded and may be forced axially into engagement by relative rotation thereof.

WILLIAM HUDSON JAMES BROCK.